(12) United States Patent
Shim et al.

(10) Patent No.: US 9,710,149 B2
(45) Date of Patent: Jul. 18, 2017

(54) METHOD AND APPARATUS FOR DISPLAYING USER INTERFACE CAPABLE OF INTUITIVELY EDITING AND BROWSING FOLDER

(75) Inventors: Jung-hyun Shim, Gyeonggi-do (KR); Won-young Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 124 days.

(21) Appl. No.: 13/250,243

(22) Filed: Sep. 30, 2011

(65) Prior Publication Data

US 2012/0124513 A1    May 17, 2012

(30) Foreign Application Priority Data

Nov. 17, 2010    (KR) .................. 10-2010-0114555

(51) Int. Cl.
G06F 3/048    (2013.01)
G06F 3/0488    (2013.01)

(52) U.S. Cl.
CPC .................. G06F 3/0488 (2013.01)

(58) Field of Classification Search
CPC ....... G06F 3/04815; G06F 2203/04802; G06F 3/0486; G06F 3/04817; G06F 3/0485; G06F 3/0482; G06F 3/0488
USPC ....... 715/211, 214, 243, 252, 764, 766, 769, 715/782
See application file for complete search history.

(56) References Cited

U.S. PATENT DOCUMENTS

| | | | |
|---|---|---|---|
| 5,678,015 A * | 10/1997 | Goh .............................. | 715/782 |
| 5,880,733 A * | 3/1999 | Horvitz et al. ............... | 715/850 |
| 6,577,330 B1 * | 6/2003 | Tsuda et al. .................. | 715/782 |
| 6,983,424 B1 * | 1/2006 | Dutta .................. | G06F 3/04817 |
| | | | 715/790 |
| 7,735,018 B2 * | 6/2010 | Bakhash ....................... | 715/782 |
| 2004/0103102 A1 * | 5/2004 | Nelson ............. | G06F 17/30014 |
| 2006/0253796 A1 * | 11/2006 | Wang et al. .................. | 715/788 |
| 2007/0250788 A1 * | 10/2007 | Rigolet ......................... | 715/788 |
| 2008/0189645 A1 * | 8/2008 | Kapanen et al. ............ | 715/777 |
| 2008/0215980 A1 | 9/2008 | Lee et al. | |
| 2009/0058821 A1 | 3/2009 | Chaudhri et al. | |
| 2009/0089752 A1 * | 4/2009 | Tristram ...................... | 717/120 |
| 2009/0158173 A1 * | 6/2009 | Palahnuk et al. ............ | 715/753 |
| 2009/0222766 A1 | 9/2009 | Chae et al. | |
| 2010/0222112 A1 * | 9/2010 | Han ............................. | 455/566 |

(Continued)

FOREIGN PATENT DOCUMENTS

EP    2 075 682    7/2009
KR    1020010022847    3/2001

(Continued)

OTHER PUBLICATIONS

Korean Office Action dated Jun. 21, 2016 issued in counterpart application No. 10-2010-0114555, 8 pages.

(Continued)

*Primary Examiner* — Wilson Tsui

(74) *Attorney, Agent, or Firm* — The Farrell Law Firm, P.C.

(57) ABSTRACT

Provided is a method and apparatus for displaying a user interface by displaying a first screen including at least one icon and a second screen including a first region obtained by reducing the size of the first screen 3-Dimensionally depending on an input of a user to edit or browse a folder, and a second region displaying folder content.

20 Claims, 14 Drawing Sheets

(56) References Cited

U.S. PATENT DOCUMENTS

2011/0083103 A1\* 4/2011 Shim et al. .................. 715/810
2011/0179368 A1\* 7/2011 King et al. .................. 715/769
2012/0036460 A1\* 2/2012 Cieplinski ............. G06F 3/0481
  715/769

FOREIGN PATENT DOCUMENTS

KR   1020070107892   11/2007
KR   1020100057358    5/2010

OTHER PUBLICATIONS

European Search Report dated Jul. 19, 2016 issued in counterpart application No. 11841378.0-1959, 8 pages.
European Search Report dated Apr. 4, 2017 issued in counterpart application No. 11841378.0/1879, 6 pages.

\* cited by examiner

US 9,710,149 B2

METHOD AND APPARATUS FOR DISPLAYING USER INTERFACE CAPABLE OF INTUITIVELY EDITING AND BROWSING FOLDER

PRIORITY

This application claims priority under 35 U.S.C. §119 to a Korean Patent Application No. 10-2010-0114555, which was filed in the Korean Intellectual Property Office on Nov. 17, 2010, the entire disclosure of which is incorporated herein in its entirety by reference.

BACKGROUND OF THE INVENTION

1. Field of the Invention

The present invention relates generally to a method and apparatus for displaying a user interface, and more particularly, to a method and apparatus for displaying a folder and an icon in an environment where both the folder and the icon exist.

2. Description of the Related Art

With the increase in the number of portable devices, a method for effectively displaying a user interface on a small screen has become an important issue. A user interface display needs to be intuitive and also sufficiently aesthetically pleasing to the user to conveniently utilize a portable device.

Additionally, the number of application programs executable in the portable device has increased due to improvements in hardware performance and software development environments, resulting in a user interface utilizing icon folders to organize icons of various application programs stored in the portable device.

SUMMARY OF THE INVENTION

Accordingly, the present invention has been made to solve the above-mentioned problems, and to provide at least the advantages as described below. An aspect of the present invention provides a method and apparatus for effectively displaying a folder and an icon, and a computer readable recording medium having recorded thereon a program for executing the method.

According to an aspect of the present invention, there is provided a method of displaying a user interface, the method including displaying a first screen including at least one icon, and displaying a second screen including a first region obtained by reducing the size of the first screen, and a second region displaying folder content according to an input of a user to edit or browse a folder, wherein the first region is generated depending on changing a size of the at least one icon according to a location of the at least one icon on the first screen.

According to another aspect of the present invention, there is provided an apparatus for displaying a user interface, the apparatus including a controller for generating a first screen including at least one icon, and a second screen including a first region obtained by reducing the size of the first screen, and a second region displaying folder content according to an input of a user to edit or browse a folder; and a display unit for displaying the first and second screens, wherein the first region is generated depending on changing a size of the at least one icon according to a location of the at least one icon on the first screen.

According to another aspect of the present invention, there is provided a computer readable recording medium having recorded thereon a program for executing the method.

BRIEF DESCRIPTION OF THE DRAWINGS

The above and other features and advantages of the embodiments of the present invention will be more apparent from the following description taken in conjunction with the accompanying drawings in which.

DETAILED DESCRIPTION OF THE EMBODIMENTS OF THE PRESENT INVENTION

Figure 1:
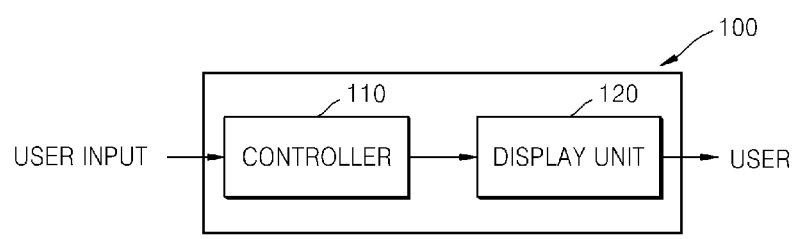
FIG. 1 is a block diagram of an apparatus for displaying a user interface, according to an embodiment of the present invention.

Hereinafter, the present invention will be described in greater detail with reference to the accompanying drawings, in which aspects of the present invention are illustrated. In the following description, same or similar drawing reference numerals are used for the same or similar elements throughout the drawings.

FIG. 1 is a block diagram of an apparatus 100 for displaying a user interface, according to an embodiment of the present invention.

Referring to FIG. 1, the apparatus 100 includes a controller 110 and a display unit 120.

The controller 110 generates screens to be displayed to a user through the display unit 120. The controller 110 generates a first screen including at least one icon, and a second screen including a first region obtained by reducing the size of the first screen according to an input of the user to edit or browse a folder, and a second region displaying the folder content.

The first screen includes at least one icon, which may represent a predetermined application program or a predetermined folder. The first region included in the second screen may be obtained by reducing the size of the first screen such that the user looking at the second screen experiences a 3-Dimensional (3D) effect.

The user may view an apparent 3D space on a 2D screen by applying a predetermined shade effect to the first region while reducing the size of the first region, or depending on adjusting a degree of reduction of an icon according to a location of the icon on the first screen.

The display unit 120 displays the screen generated by the controller 110. The display unit 120 receives an image signal about the screen from the controller 110, and displays the screen according to the image signal via a display device, such as a Liquid Crystal Display (LCD) panel or an Organic Light Emitting Display (OLED) panel, included in the display unit 120. The screen generated by the controller 110 displayed on the display unit 120 will be described in detail with reference to FIGS. 2A through 6C.

FIGS. 2A through 2G are diagrams of a user interface for generating a folder, according to an embodiment of the present invention. In the following description the display device is a touch screen, which both displays a screen and receives user input.

Figure 2A:
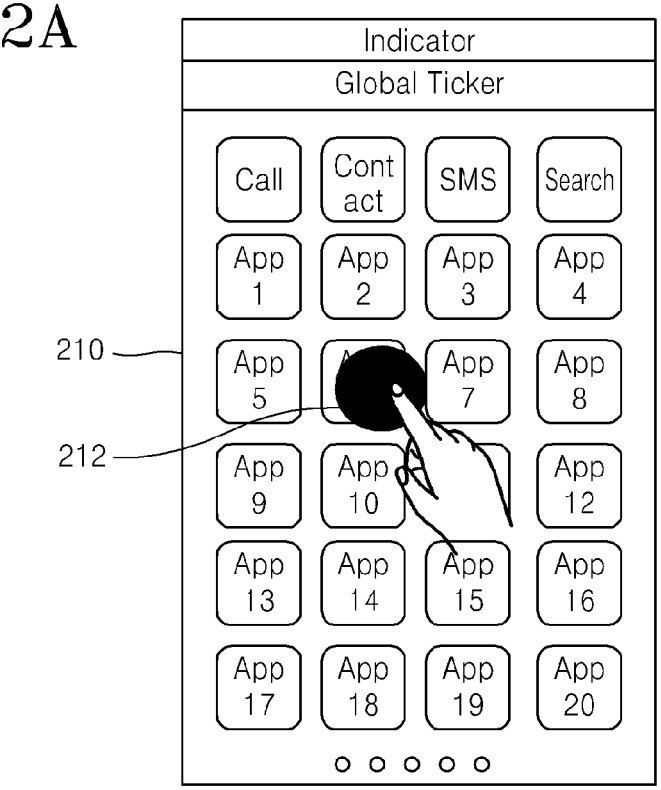
FIGS. 2A through 2G are diagrams of a user interface for generating a folder, according to an embodiment of the present invention.
Figure 2B:
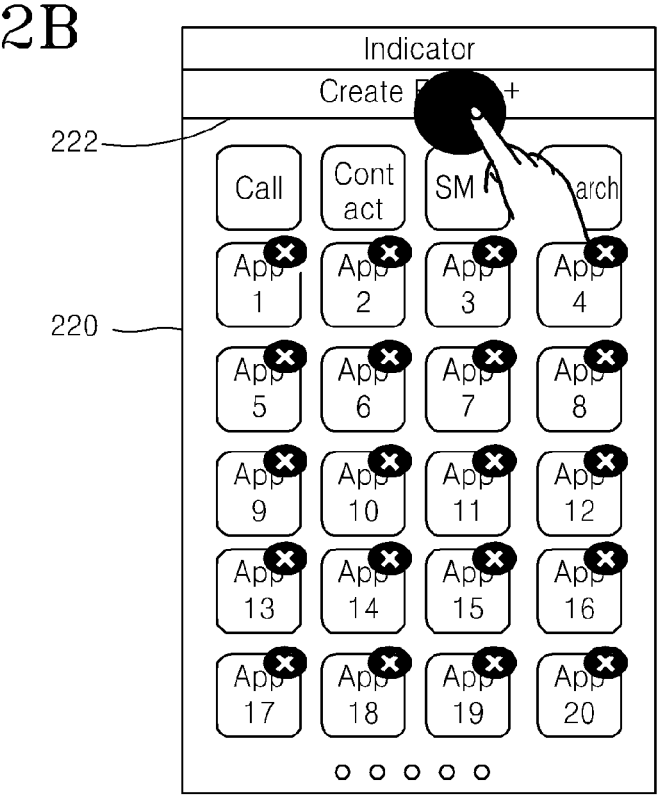

Referring to FIG. 2A, a screen 210 including at least one icon is generated by the controller 110 and displayed by the display unit 120. The icon displayed on the screen 210 may represent a predetermined application program or a predetermined folder. When the user performs a control operation to edit the screen 210 on the screen 210 of FIG. 2A, the display changes to screen 220 of FIG. 2B. Although the screen 220 of FIG. 2B includes the at least one icon, the screen 220 may additionally be used to delete an icon, generate a folder, or the like.

When the user touches a predetermined icon for a predetermined period of time on the screen 210, the screen 210 may be changed to the screen 220. However, touching the predetermined icon for the predetermined period of time is only one example of a control operation for editing the screen 210, and the editing screen 220 may be invoked using other methods.

For example, the screen 220 may be displayed when the user pushes a button separate from the touch screen of the display device, or touches a different touch sensor. Alternatively, if the display device includes a motion sensor, the user may move the display device in a predetermined motion to invoke the display of the editing screen 220. Alternatively, the screen 220 may be displayed by shaking or rotating the display device.

An "x" for deleting an application is displayed on the screen 220 for editing the screen 210, and a region 222 related to a folder generating function is displayed on the top of the screen 220. However, a location of the region 222 is not limited to the top of the screen 220, and may be elsewhere, for example on the left or the right of the screen 220.

Figure 2C:
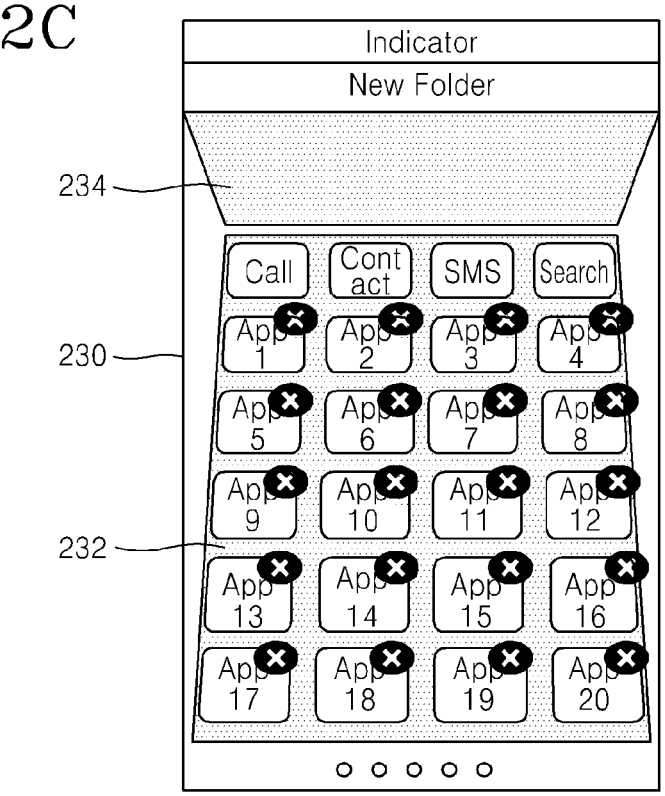

After the user selects the region 222, for example, by touching the region 222, a screen 230 of FIG. 2C is displayed. Alternatively, the screen 230 may be displayed by touching the region 222 one or more times, or by dragging the region 222 to the right or left while touching the region 222.

The screen 230 includes a first region 232 obtained by reducing the size of the screen 220, and a second region 234 displaying folder content. The screen 220 is reduced in size according to a predetermined perspective to generate a 3D effect, by setting a virtual vanishing point inside or outside the screen 230, and including the screen 220 in the first region 232 on a plane formed by the vanishing point in the lower boundary of the screen 230.

Since the screen 220 is reduced in size to generate the 3D effect, not only the height of the screen 220 is reduced, but also the size of the icons of the screen 220 is adjusted depending on the location of the icon on the screen 220. When the vanishing point is positioned in the upper direction of the screen 230 as shown in FIG. 2C, the upper icon of the screen 220 may be adjusted to be smaller than the lower icon of the screen 220.

Since the screen 220 is reduced in size after setting the vanishing point, the first region 232 obtained by reducing the size of the screen 220 has a trapezoidal shape, wherein the upper width is smaller than the lower width, and an icon located in the first region 232 also has a trapezoidal shape, wherein the upper width is smaller than the lower width. The lower width of the first region 232 is identical to a width of the screen 220, and the upper width of the first region 232 is reduced in size to be smaller than the lower width.

Since the region 222 is directed to the folder generating function, there is no content displayed on the second region 234 where the folder content is displayed. Since a new folder is generated, the user interface for displaying a folder name displays "New Folder".

Figure 2D:
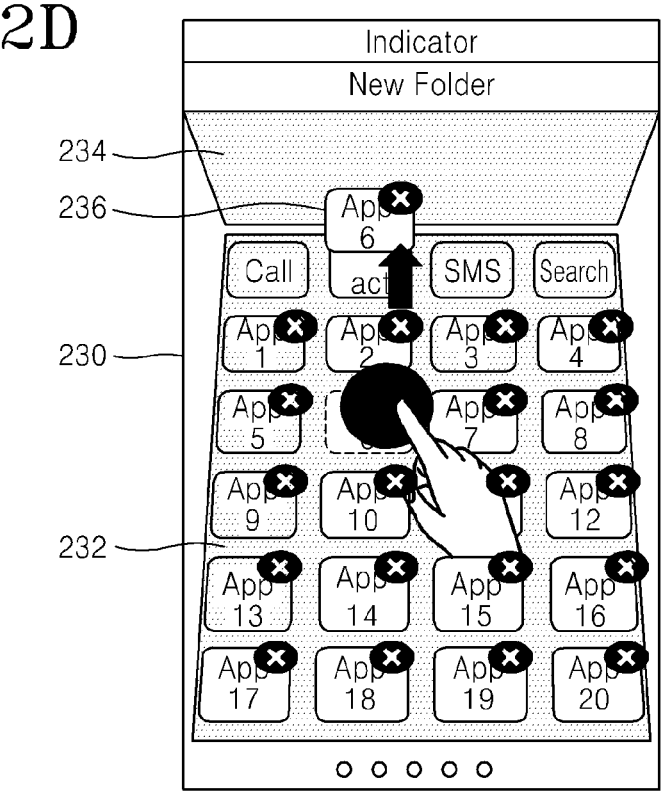

The user selects an icon 236 to be included in the folder from the screen 230, as shown in FIG. 2D. As shown in FIG. 2D, the user may select the icon 236 in the first region 232 by moving the icon 236 to the second region 234 via a drag and drop method. Alternatively, the user may touch the icon 236 in the first region 232 from the screen 230 of FIG. 2C, and the touched icon 236 may move to the second region 234.

Figure 2E:
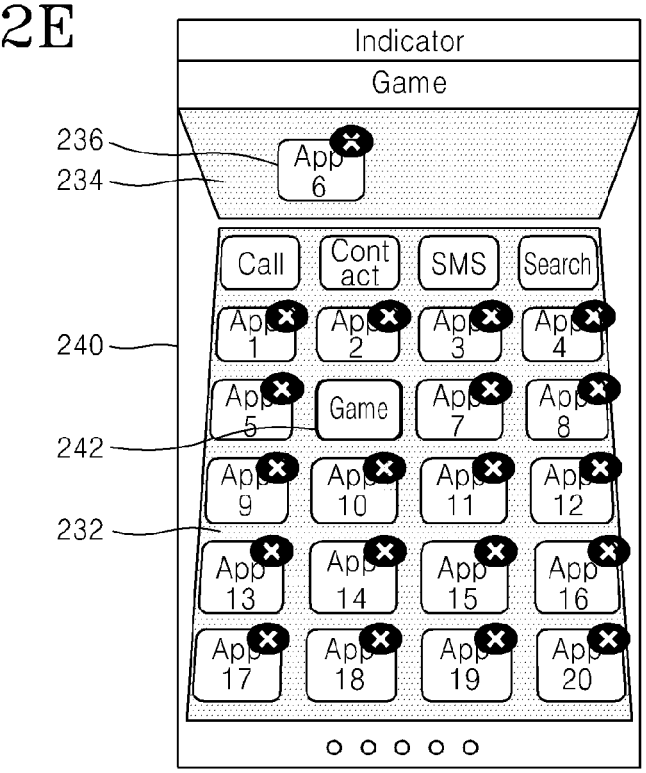

FIG. 2E illustrates a screen 250 that is displayed when an icon to be included in a folder is selected as in FIG. 2D. As shown in FIG. 2D, when the icon 236 is selected as the icon to be included in the folder, the icon 236 is displayed on the second region 234, and icon 242 representing the newly generated folder is displayed in its place, that is at the previous location of the icon 236 in the first region 232. However, the icon 242 may also be displayed at another location other than where the icon 236 was previously located.

For example, when the icon 236 is selected and displayed on the second region 234, other icons may all move by one space over to fill the location of the icon 236. Then, an empty space is generated at the bottom right of a screen 240, and the icon 242 may be displayed in the empty space.

Figure 2F:
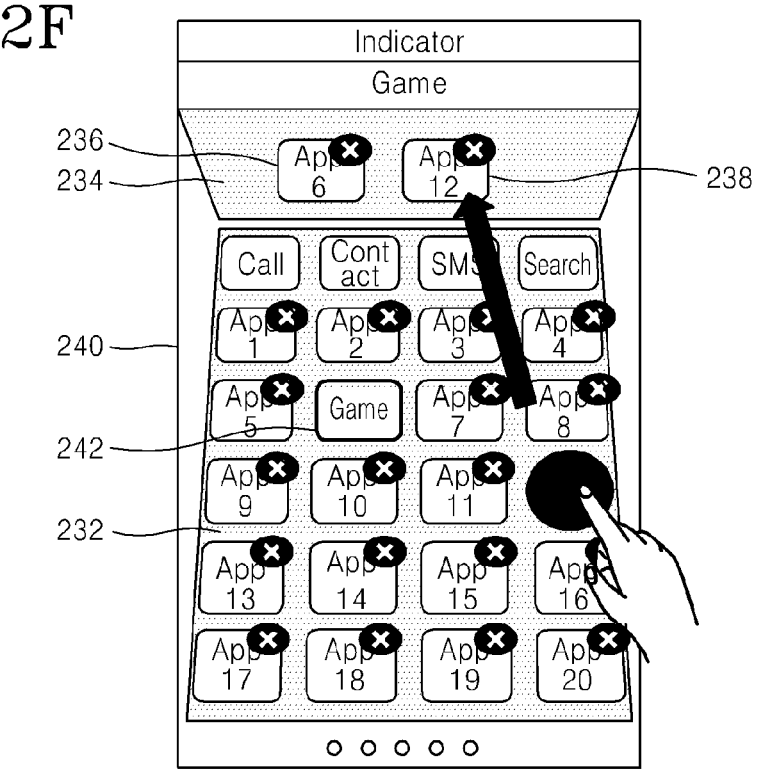

FIG. 2F illustrates additional selection of another icon 238 to be included in the newly created folder. As shown in FIG. 2F, when the other icon 238 is additionally selected from the screen 240 of FIG. 2E, the other icon 238 is displayed on the second region 234, and the location where the other icon 238 was previously located becomes an empty space.

Figure 2G:
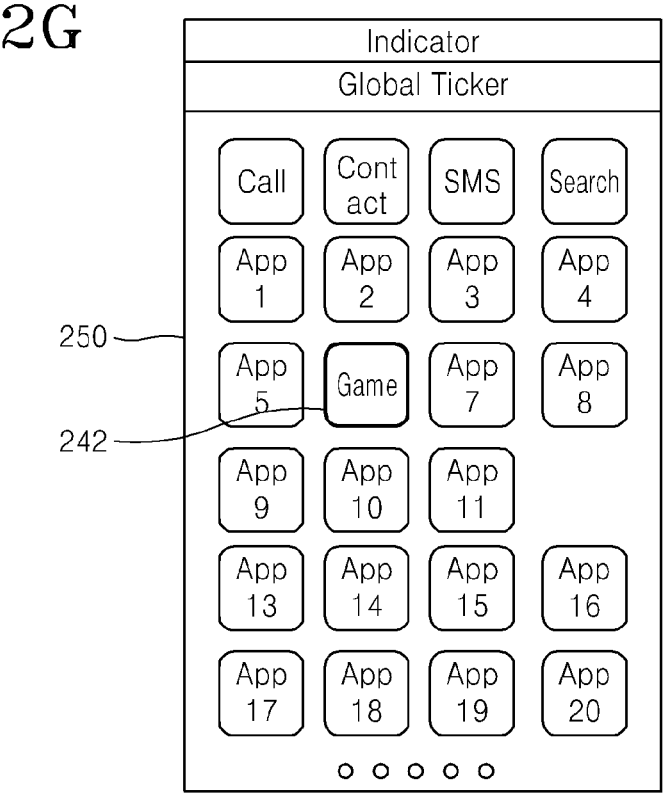

When folder editing is completed and the user performs a control operation to complete the editing of the folder, the screen 250 of FIG. 2G is displayed. The screen 250 of FIG. 2G, displayed after completing editing the folder, may be also be invoked by pressing a button, separate from the display device.

The screen 250 of FIG. 2G includes the icon 242 representing the newly generated folder. The icon 242 is displayed at the location where the icon 236 representing "App 6" was previously located, and the location where the other icon 238 representing "App 12" was previously located becomes an empty space.

Figure 3A:
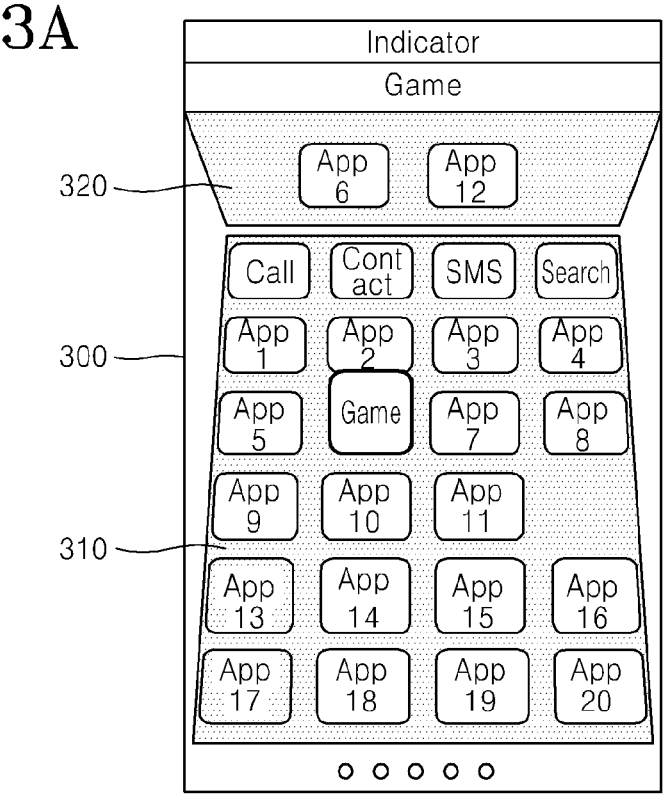
FIGS. 3A through 3C are diagrams of a user interface for browsing a folder, according to an embodiment of the present invention.
Figure 3B:
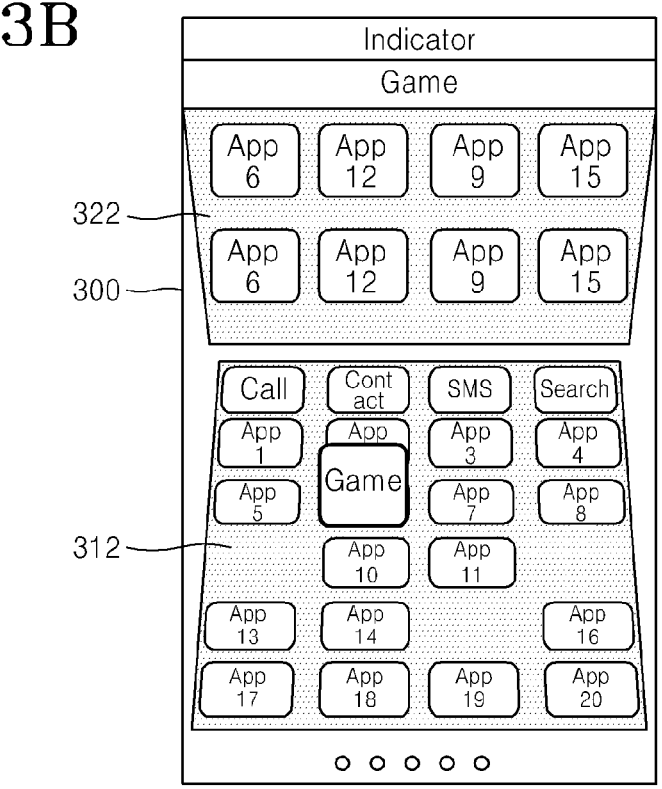
Figure 3C:
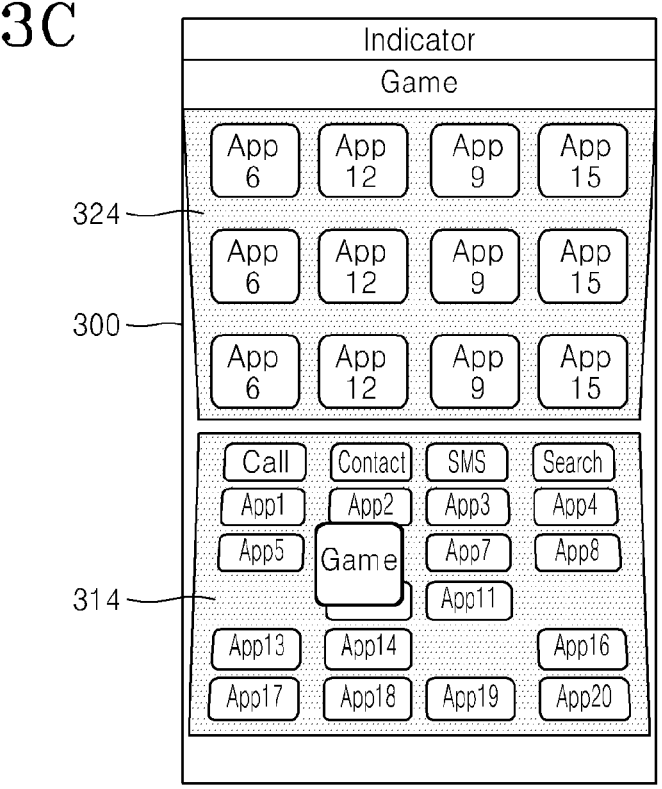

FIGS. 3A through 3C are diagrams of a user interface for browsing a folder, according to an embodiment of the present invention. FIGS. 3A through 3C illustrate a first region and a second region displayed on a screen when an icon representing a folder is selected from a first screen.

For example, when the icon 242 representing the folder is selected, for example, by being touched, on the screen 250 of FIG. 2G, a screen 300 including a first region 310 obtained by reducing the size of the screen 250 to generate a 3D effect, and a second region 320 for displaying folder content, is displayed.

Here, the size of the second region 320 is determined based on the folder content, i.e., the number of icons representing application programs included in the folder. As shown in FIGS. 3B and 3C, a second region 322 or 324 widens as the number of icons representing application programs included in the folder increases, and thus a first region 312 or 314 narrows on the screen 300. When the size of the second region 322 or 324 increases as the number of icons increases, the narrower first region 312 or 314 is displayed on the screen 300 by reducing the size of the screen 250 by a greater size reduction ratio. The narrower first region 312 or 314 may be displayed on the screen 300 by changing a location of the vanishing point discussed above.

When a user selects, for example, by touching, an icon in the second region 320, 322, or 324 of the screen 300 of FIG. 3A, 3B, or 3C for browsing folder content, an application program corresponding to the icon is executed. However, alternatively, when the user selects, for example, by touching, a region outside of the second region 320, 322, or 324, displaying of the screen 300 for browsing the folder is completed, and the screen 250 including the icon representing the folder and the icons representing the application programs is again displayed.

FIGS. 4A through 4E are diagrams of a user interface for changing a name of a folder, according to an embodiment of the present invention.

Figure 4A:
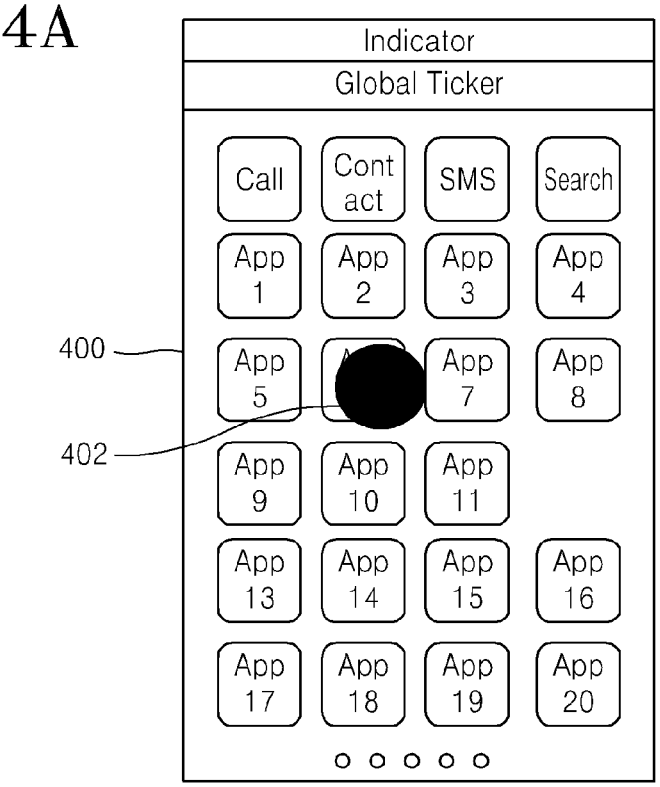
FIGS. 4A through 4E are diagrams of a user interface for changing a name of a folder, according to an embodiment of the present invention.

Referring to FIG. 4A, a user performs an operation to edit folder content on a screen 400 including icons representing application programs and icons representing folders. The operation to edit the folder content includes changing a folder name. When a predetermined time is maintained after touching an icon 402 representing a folder on the screen 400, a screen 410 of FIG. 4B for editing the folder may be displayed.

Figure 4B:
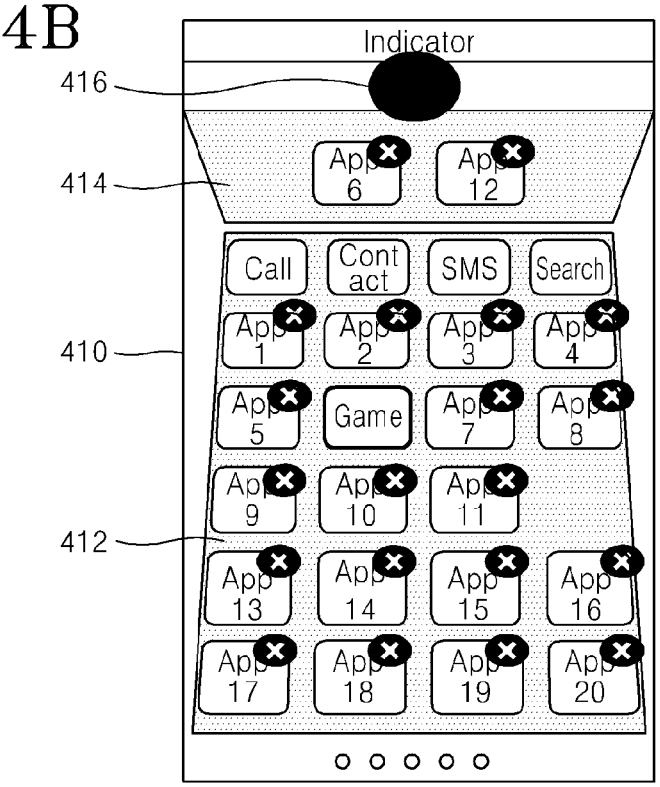

The screen 410 of FIG. 4B is a screen for editing all folder content, including the folder name, and includes a first region 412 obtained by reducing the size of the screen 400 of FIG. 4A to generate a 3D effect, and a second region 414 for displaying folder content. In order to change a folder name, the user selects a region 416 at the upper portion of the screen 410 where the folder name is displayed. The region 416 may be selected by touching the region 416.

Figure 4C:
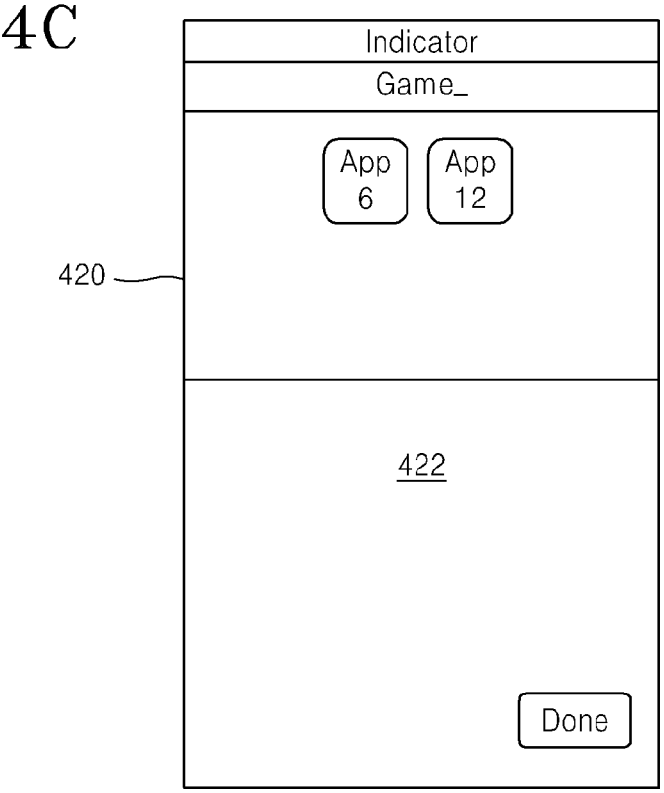
Figure 4D:
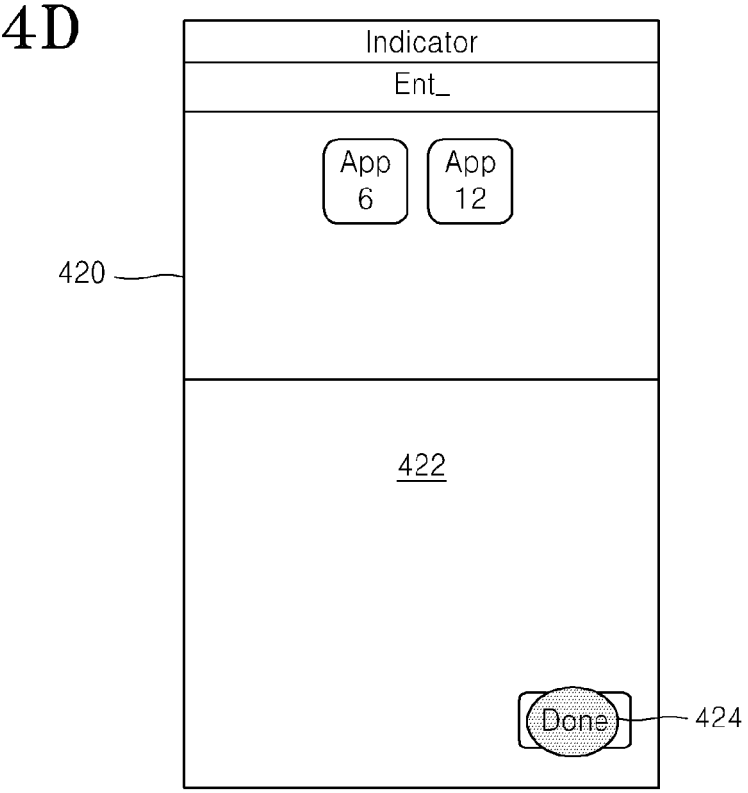

When the user selects the region 416, a screen 420 of FIG. 4C is displayed. The screen 420 of FIG. 4C displays an input device 422 implemented in software, to change the folder name. For example, a keyboard for inputting characters may be displayed. When the folder name is changed from "Game" to "Ent" through the input device 422, a user interface 424 of FIG. 4D for completing the input is selected.

Figure 4E:
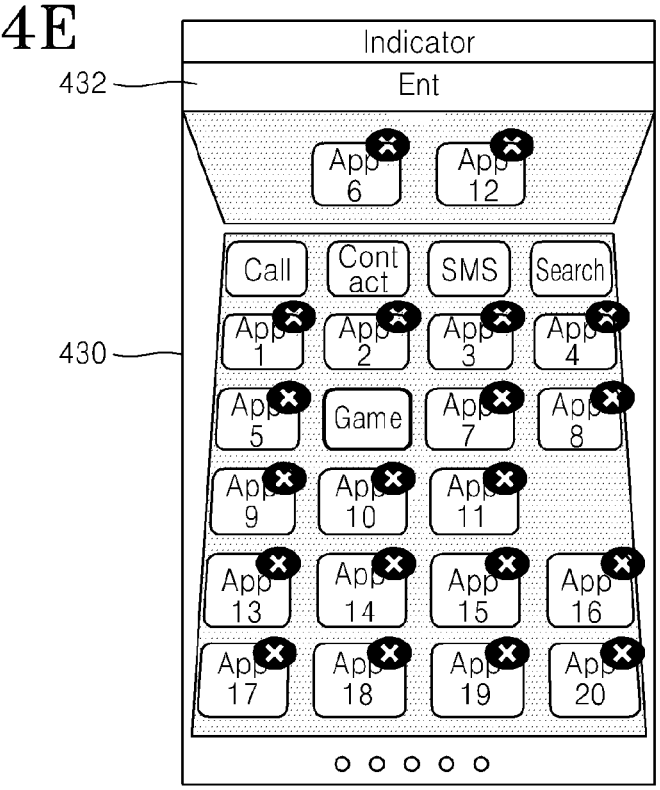

When the user interface 424 is selected, a screen 430 of FIG. 4E for editing a folder is displayed. The screen 430 is identical to the screen 410 of FIG. 4B except that the folder name is changed from "Game" to "Ent", and the changed folder name is reflected on a region 432 for displaying a folder name.

FIGS. 5A through 5E are diagrams of a user interface for editing folder content, according to an embodiment of the present invention.

Figure 5A:
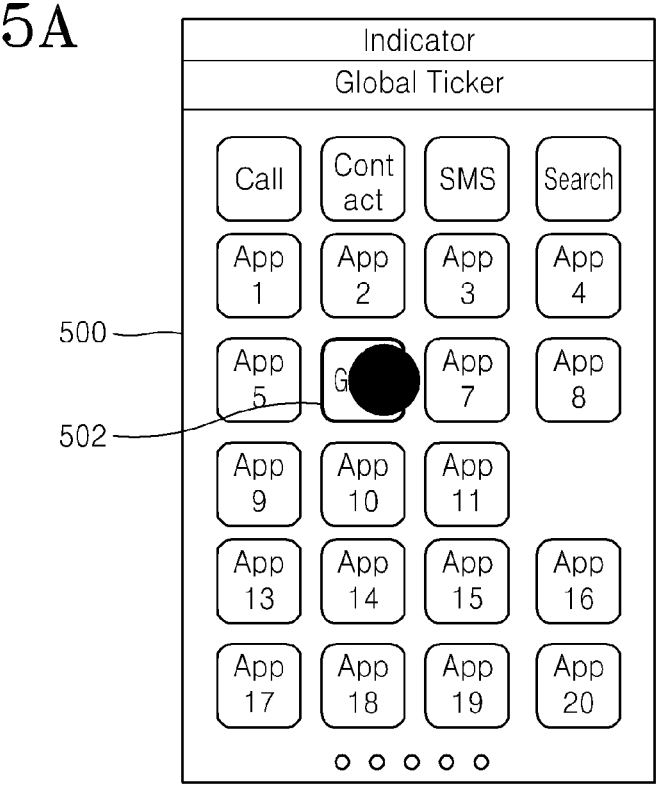
FIGS. 5A through 5E are diagrams of a user interface for editing content of a folder, according to an embodiment of the present invention.

Referring to FIG. 5A, a user performs a control operation for editing folder content on a screen 500 including icons representing application programs and icons representing folders. When an icon 502 representing a folder from the screen 500 is touched for a predetermined period of time, a screen 510 of FIG. 5B for editing a folder may be displayed.

Figure 5B:
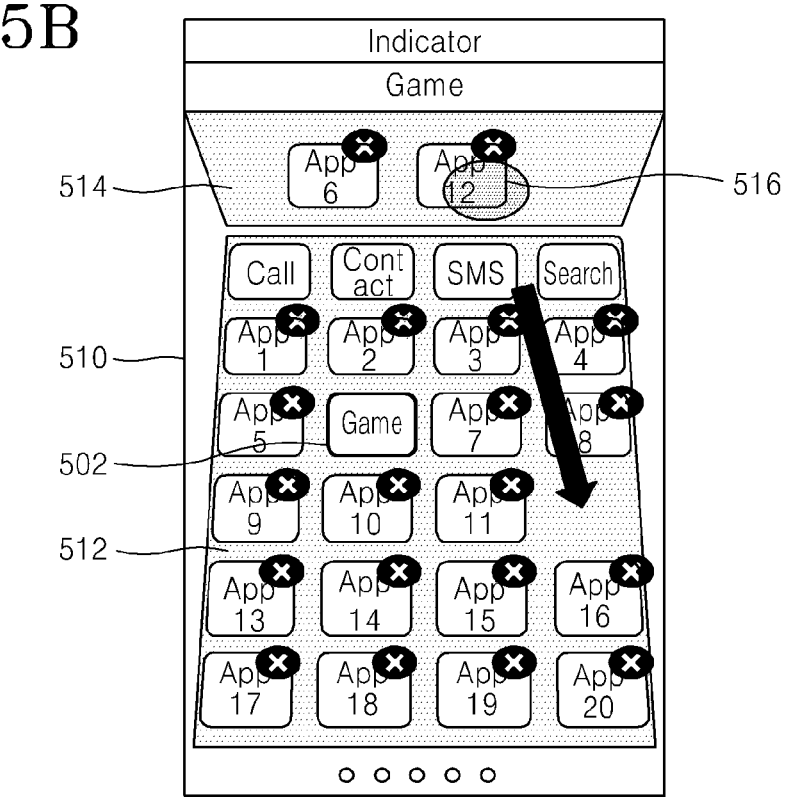

The screen 510 of FIG. 5B is a screen for editing not only a folder name, but also all folder content, and includes a first region 512 obtained by reducing the size of the screen 500 of FIG. 5A to generate a 3D effect, and a second region 514 for displaying folder content. The editing of folder content includes adding or deleting an icon.

The icon to be added to a folder may be selected from the first region 512, as described above with reference to FIG. 2D. Alternatively, in order to delete an icon from a folder and display the icon again on the first region 512, an icon to be deleted may be selected from the second region 514. The icon to be deleted from the folder may be selected by moving a predetermined icon 516 in the second region 514 to the first region 512 by using a drag and drop method.

Figure 5C:
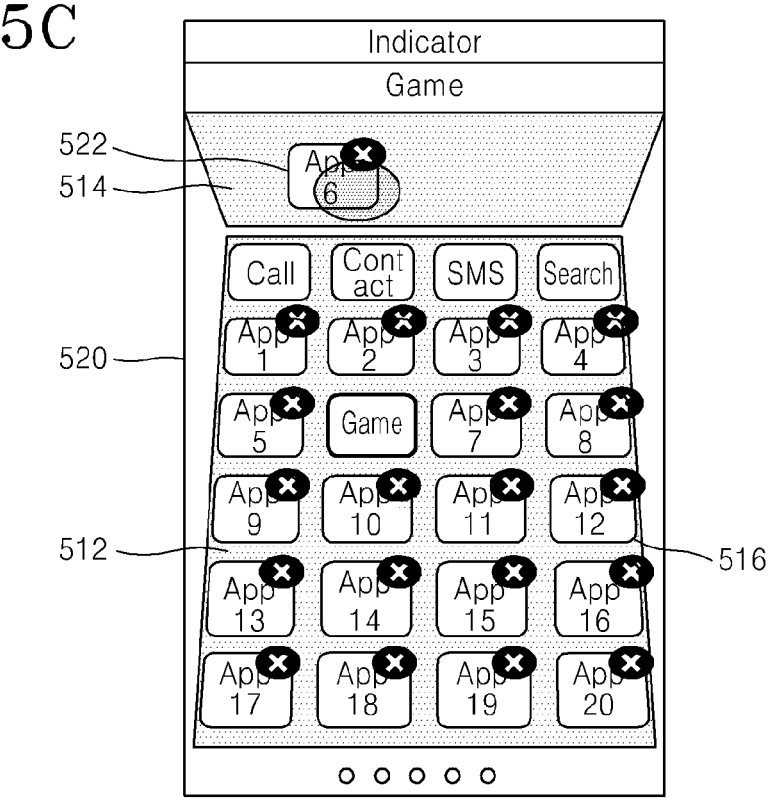

As the predetermined icon 516 is deleted from the folder, the predetermined icon 516 is displayed again on the first region 512 and only one icon is displayed on the second region 514 as shown in FIG. 5C.

Figure 5D:
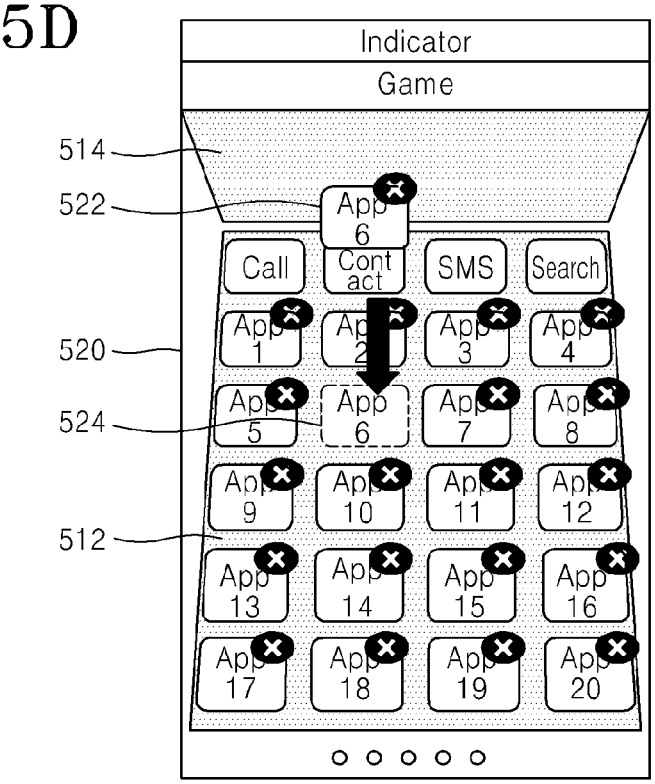

Also, as shown in FIG. 5D, a last icon 522 included in the folder may be further deleted from a screen 520 of FIG. 5C to be displayed on the first region 512. Here, the last icon 522 may be moved to the first region 512 by using a drag and drop method, and at this time, the last icon 522 may be moved to a location where the icon 502 exists.

Figure 5E:
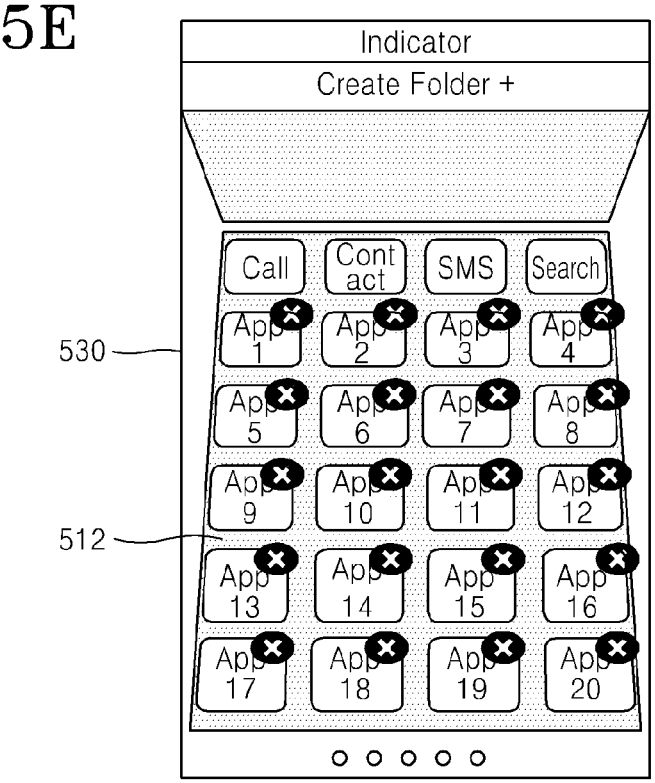

When icons 516 and 522 included in the folder are all moved to the first region 512, the icon 502 is also deleted from the region 512 as shown in FIG. 5E, as the folder is deleted.

Figure 6A:
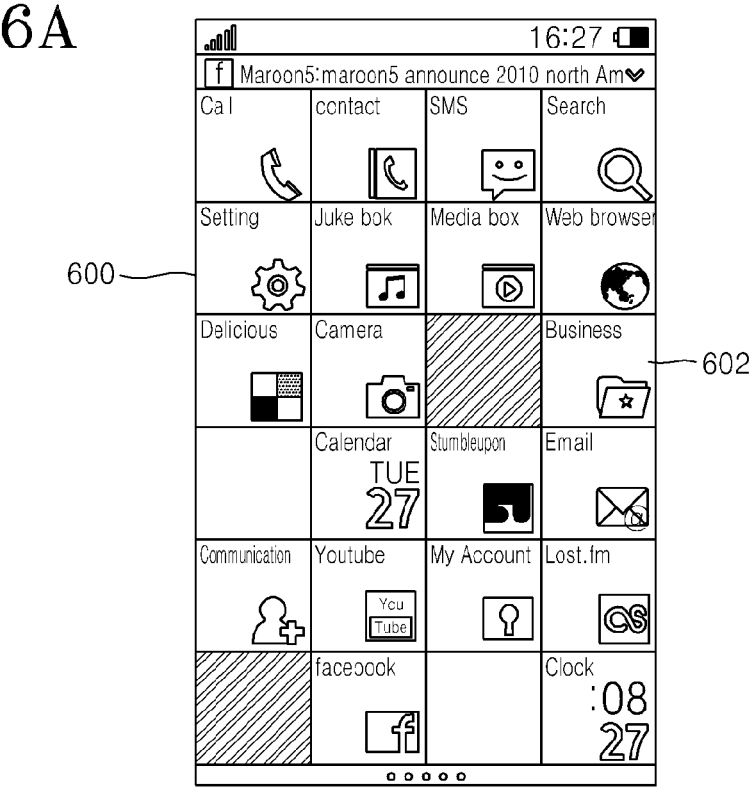
FIGS. 6A through 6C are diagrams of a user interface for browsing a folder, according to another embodiment of the present invention.
Figure 6B:
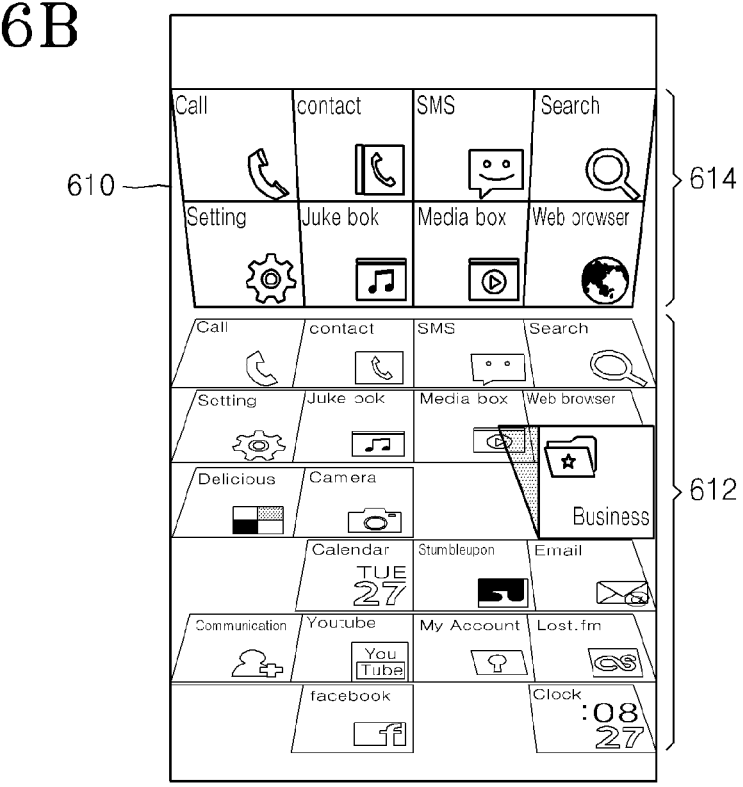
Figure 6C:
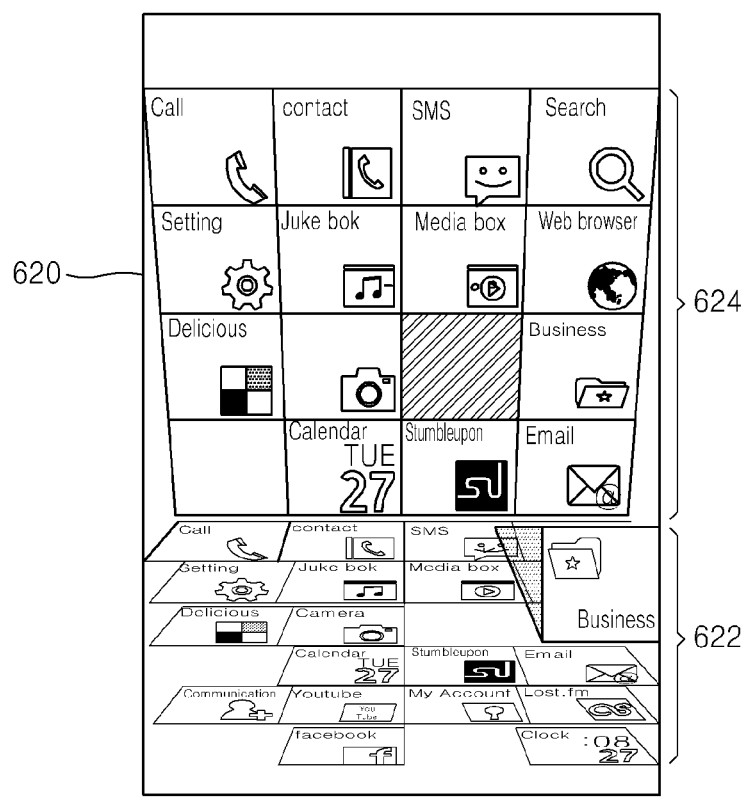

FIGS. 6A through 6C are diagrams of a user interface for browsing a folder, according to another aspect of the present invention.

When a user selects an icon 602 representing a folder from a screen 600 of FIG. 6A including icons representing application programs and icons representing folders, a screen 610 of FIG. 6B including a first region 612 obtained by reducing a first screen to generate a 3D effect, and a second region 614 displaying icons included in a folder is displayed. In FIGS. 3A through 3C, one vanishing point is determined and the screen 250 is reduced based on the vanishing point to generate the first region 310, 312, or 314.

However, in FIGS. 6B and 6C, the vanishing point is determined based on the line level of icons, and then the icons are reduced in size according to line levels to generate a 3D effect. In other words, icons representing application programs "Call", "Contact", "SMS", and "Search" in the first line are reduced to a trapezoidal shape according to a first vanishing point to generate a 3D effect, and icons representing application programs "Setting", "Juke box", "Media box", and "Web browser" in the second line are reduced to a trapezoidal shape according to a second vanishing point to generate a 3D effect.

A vanishing point may be set for each of the other line levels excluding the first and second lines, and icons may be reduced based on the vanishing point. Referring to FIG. 6B, a height of an icon included in an upper line level of the screen 600 is lower than the height of an icon included in a lower line level of the screen 600. An apparent 3D effect perceived by the user increases by reducing the size of the icons according to line levels while differently reducing the heights of icons according to their locations.

In FIG. 6C, the number of icons included in a second region 624 is greater than that included in the second region 614 of FIG. 6B. As the size of the second region 624 increases and becomes larger than that of the second region

614 of FIG. 6B, the size of a first region 622, which is obtained by reducing the size of the screen 600, decreases.

In FIGS. 6B and 6C, the folder content is browsed. Alternatively, a screen displayed to edit the folder content may be generated by setting a vanishing point according to line levels of icons and reducing the icons as shown in FIGS. 6B and 6C.

Figure 7:
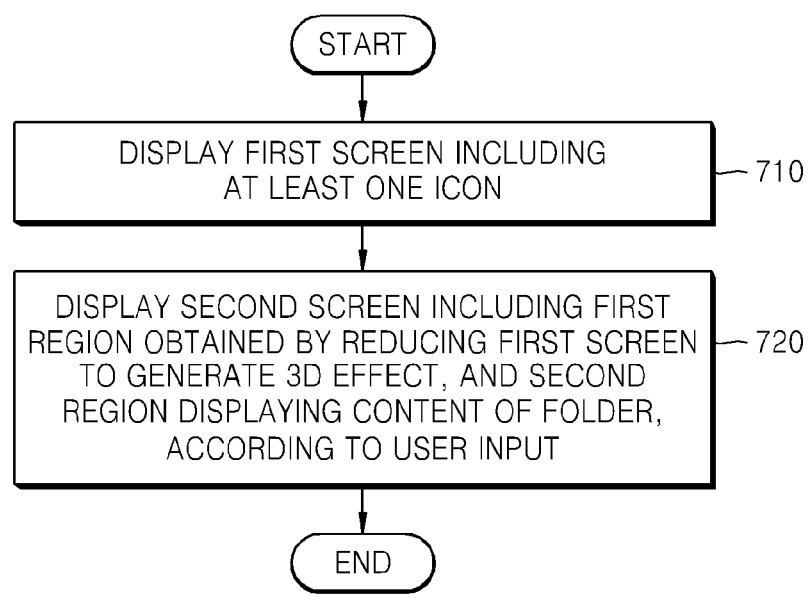
FIG. 7 is a flowchart illustrating a method of displaying a user interface, according to an embodiment of the present invention.

FIG. 7 is a flowchart illustrating a method of displaying a user interface, according to an embodiment of the present invention.

Referring to FIG. 7, the apparatus 100 displays a first screen including at least one icon in step 710. At least one of an icon representing an application program and an icon representing a folder may be displayed on the first screen. The first screen may be the screen 210 of FIG. 2A, the screen 400 of FIG. 4A, the screen 500 of FIG. 5A, or the screen 600 of FIG. 6A.

In step 720, the apparatus 100 displays a second screen including a first region obtained by reducing the first screen, and a second region displaying folder content, according to a user input for editing or browsing a folder.

Here, the screen 230 of FIG. 2C for generating a new folder, the screen 300 of FIGS. 3A through 3C for browsing a folder, or the screen 510 of FIG. 5B for editing a folder may be displayed. Alternatively, the screen 610 of FIG. 6B or a screen 620 of FIG. 6C for browsing a folder or a screen may be displayed. When the second screen is displayed, the folder content displayed on the second region may be edited, or an icon displayed on the second region may be selected to execute a predetermined application program.

According to the present invention, a user may easily select, browse, and edit a folder or an icon displayed on a screen of a display device. Also, the user using the display device may be highly satisfied since the icon and folder content is displayed on one screen in 3D.

The invention can also be embodied as computer readable codes on a computer readable recording medium.

For example, the apparatus for displaying a user interface, according to the embodiment of the present invention, may include a bus coupled to each unit of the apparatus shown in FIG. 1, and at least one processor combined to the bus. Also, the apparatus may further include a memory coupled to the at least one processor for performing a command by combined to the bus for storing a command, a received message, or a generated message.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been shown and described with reference to various embodiments thereof, it will be understood by those of ordinary skill in the art that various changes in form and detail may be made therein without departing from the spirit and scope of the present invention as defined by the appended claims.

What is claimed is:

1. A method of displaying a user interface, the method comprising:
    displaying a first screen including at least one icon;
    in response to receiving a first touch input to modify the first screen, displaying a second screen including a first region and a second region, wherein the first region includes the first screen reduced in size so that the first screen is fully displayed in the first region and the second region is for displaying at least one icon associated with content of a folder displayed in the first region; and
    after receiving the first touch to modify the first screen to display the second screen, in response to receiving a second touch input of an icon displayed in the first region, displaying the touched icon in the second region and displaying an icon corresponding to a new folder in the first region,
    wherein a size of the second region is automatically changed based on a number of icons displayed in the second region, and
    wherein sizes of icons included in the first region are changed based on the number of icons displayed in the second region.

2. The method of claim 1, wherein the first region is obtained by reducing a height of the first screen so that the first region is displayed on the second screen in a remaining region excluding the second region.

3. The method of claim 1, wherein an upper width of the first region is relatively smaller than a lower width of the first region, and the lower width of the first region is equal to a width of the first screen.

4. The method of claim 1, wherein the size of the second region increases as the number of icons displayed in the second region increases.

5. The method of claim 1, wherein the at least one icon displayed on the first screen has a square shape,
    wherein the icon displayed in the first region and the first region have trapezoidal shapes, and
    wherein an upper width of the first region is smaller than a lower width of the first region.

6. An apparatus for displaying a user interface, the apparatus comprising:
    a display device; and
    a controller configured to:
        control the display device to display a first screen including at least one icon,
        in response to receiving a first touch input to modify the first screen, control the display device to display a second screen including a first region and a second region, wherein the first region includes the first screen reduced in size so that the first screen is fully displayed in the first region and the second region is for displaying at least one icon associated with content of a folder displayed in the first region, and
        after receiving the first touch to modify the first screen to display the second screen, in response to receiving a second touch input of an icon displayed in the first region, display the touched icon in the second region and display an icon corresponding to a new folder in the first region,
        wherein a size of the second region is automatically changed based on a number of icons displayed in the second region, and
        wherein sizes of icons included in the first region are changed based on the number of icons displayed in the second region.

7. The apparatus of claim 6, wherein the first region is obtained by reducing a height of the first screen so that the first region is displayed on the second screen in a remaining region excluding the second region.

8. The apparatus of claim 6, wherein an upper width of the first region is relatively smaller than a lower width of the first region, and the lower width of the first region is equal to a width of the first screen.

9. The apparatus of claim 6, wherein the size of the second region increases as the number of icons displayed in the second region increases.

10. The apparatus of claim 6, wherein the at least one icon displayed on the first screen has a square shape,
wherein the icon displayed in the first region and the first region have trapezoidal shapes, and
wherein an upper width of the first region is relatively smaller than a lower width of the first region.

11. A non-transitory computer readable recording medium having recorded thereon a program for executing the method of displaying a user interface, the method comprising:
displaying a first screen including at least one icon;
in response to receiving a first touch input to modify the first screen, displaying a second screen including a first region and a second region, wherein the first region includes the first screen reduced in size so that the first screen is fully displayed in the first region and the second region is for displaying at least one icon associated with content of a folder displayed in the first region; and
after receiving the first touch to modify the first screen to display the second screen, in response to receiving a second touch input of an icon displayed in the first touch region, displaying the touched icon in the second region and displaying an icon corresponding to a new folder in the first region,
wherein a size of the second region is automatically changed based on a number of icons displayed in the second region, and
wherein sizes of icons included in the first region are changed based on the number of icons displayed in the second region.

12. A method of moving a least one icon from a second region to a first region in a second region, the method comprising:
displaying a first screen including a folder;
receiving a user input to modify the folder;
reducing, in response to the user input, a size of the first screen so that the first screen is fully displayed in the first region of the second screen;
displaying the second screen including the first region and the second region;
displaying contents of the folder in the second region;
moving at least one icon included in the folder from the second region to the first region in response to a dragging input;
deleting the folder from the second region, upon moving a last of the at least one icon from the second region to the first region; and
displaying a modified first region without the folder, wherein the folder is deleted from the second region,
wherein the second region is adjacent to the first region in the second screen and displays contents of the folder,
wherein a size of the second region is automatically changed based on a number of icons that are moved to the second region, and
wherein sizes of icons included in the first region are changed based on a number of icons included in the second region.

13. The method of claim 12, wherein the received user input comprises an external input, selecting an icon representing the folder, in the first screen for a predetermined period of time.

14. The method of claim 13, wherein displaying the modified first region without the folder comprises:
deleting the icon representing the folder from the first region.

15. The method of claim 12, wherein the at least one moved icon is displayed in the first region of the second screen.

16. An apparatus for moving at least one icon from a second region to a first region in a second screen, the apparatus comprising:
a controller configured to reduce, in response to a received user input, a size of a first screen so that the first screen is fully displayed in the first region of the second screen, so as to modify a folder, to move at least one icon included in the folder from the second region to the first region in response to a dragging input, to delete the folder from the second region, upon moving a last of the at least one icon from the second region to the first region, and to modify the first region to display without the folder, when the folder is deleted from the second region; and
a display device configured to display the first screen and the second screen,
wherein the first screen includes the folder comprising at least one icon,
wherein the second screen displays the second region adjacent to the first region, the second region displaying contents of the folder,
wherein a size of the second region is automatically changed based on a number of icons that are moved to the second region, and
wherein sizes of icons included in the first region are changed based on a number of icons included in the second region.

17. The apparatus of claim 16, wherein the received user input comprises an external input, selecting an icon representing the folder, in the first screen for a predetermined period of time.

18. The apparatus of claim 17, wherein when the first region is modified to be displayed without the folder, the controller deletes the icon representing the folder from the first region.

19. The apparatus of claim 16, wherein the at least one moved icon is displayed in the first region of the second screen.

20. A method of displaying a user interface in a display device of mobile device, the method comprising:
displaying, in the display device, a first screen including a plurality of icons;
in response to receiving a first touch input to modify the first screen, displaying, in the display device, a second screen including a first region and a second region, wherein the first region includes the first screen reduced in size so that a substantial portion of the plurality of icons are displayed in the first region and the second region is for displaying at least one icon associated with content of a folder displayed in the first region; and
after receiving the first touch to modify the first screen to display the second screen, in response to receiving a second touch input of an icon displayed in the first region, displaying the touched icon in the second region and displaying an icon corresponding to a new folder in the first region, wherein a size of the second region is automatically changed based on a number of icons displayed in the second region, and wherein sizes of icons included in the first region are changed based on the number of icons displayed in the second region.

* * * * *